United States Patent
Mack

(10) Patent No.: US 6,631,882 B2
(45) Date of Patent: Oct. 14, 2003

(54) METHOD AND APPARATUS TO TEST A SHUTDOWN DEVICE WHILE PROCESS CONTINUES TO OPERATE

(76) Inventor: Robert Mack, 538 Contour Dr., Lake Charles, LA (US) 70605

( * ) Notice: Subject to any disclaimer, the term of this patent is extended or adjusted under 35 U.S.C. 154(b) by 190 days.

(21) Appl. No.: 09/925,652

(22) Filed: Aug. 9, 2001

(65) Prior Publication Data

US 2003/0034469 A1 Feb. 20, 2003

(51) Int. Cl.[7] ............................................... F16K 5/06
(52) U.S. Cl. ............................. 251/129.04; 251/315.08
(58) Field of Search ................... 251/315.08–315.16, 251/129.04

(56) References Cited

U.S. PATENT DOCUMENTS

| | | | | |
|---|---|---|---|---|
| 5,431,182 A | * | 7/1995 | Brown | 137/85 |
| 5,654,885 A | * | 8/1997 | Mayhew et al. | 700/282 |
| 5,931,044 A | * | 8/1999 | Robert | 73/168 |
| 6,082,393 A | | 7/2000 | Tye | |
| 6,176,247 B1 | | 1/2001 | Winchcomb et al. | |
| 6,186,167 B1 | | 2/2001 | Grumstrup et al. | |
| 6,453,261 B2 | * | 9/2002 | Boger et al. | 702/138 |

* cited by examiner

Primary Examiner—Michael Mar
Assistant Examiner—Melvin A. Cartagena
(74) Attorney, Agent, or Firm—Michael Jolly

(57) ABSTRACT

Method and apparatus for testing an emergency shutdown valve without disrupting the flow of the process during a testing procedure. The apparatus includes an emergency shutdown valve capable of moving about 25% beyond a fully opened position to a fully closed position. The emergency shutdown valve has a coefficient of flow which is equal to or greater than the normal coefficient of flow for the process when the valve is moved about 25% beyond its fully opened position which provides a means for moving the shutdown valve 50% of its total movement without affecting the coefficient of flow for the process. The apparatus also includes a programmable logic controller including a timer and counter, a valve actuator, valve positioner, and an alarm device for controlling the positioning and movement of the shutdown valve during a timed and scheduled shutdown valve testing process without affecting the flow of the process.

3 Claims, 1 Drawing Sheet

METHOD AND APPARATUS TO TEST A SHUTDOWN DEVICE WHILE PROCESS CONTINUES TO OPERATE

TECHNICAL FIELD

The present invention relates to emergency shutdown systems and more particularly to devices and methods for testing and verification of emergency shutdown valves without disrupting process operation and the process coefficient of flow.

BACKGROUND OF THE INVENTION

The purpose of an emergency shutdown system is to safely shutdown a process that for some reason has exceeded the normal operating envelope for that process. If the process were allowed to continue to exceed the normal operating envelope, personnel may be harmed and facilities may be damaged. The process is normally maintained within its safe operating envelope with the primary control system. If the primary control system should fail, the process may exceed the safe operating envelope where upon the emergency shutdown system would shut off raw materials to the process. The final control element of the emergency shutdown system is the shutdown device, which is usually a valve or damper. Normally this shutdown device can only be tested when a process is intentionally being shut down or after a process has been shut down since the shut down device will function to shutdown the process when the process has exceeded its safe operating envelope. The present invention is directed to controlling valve type shut down devices.

Presently there are test methods in which a change in state of an electrical contact causes a shutdown devices to go to a pre-defined position. These methods require a hardware "stop" device to be activated at the pre-defined position to prevent the shutdown device from shutting down the process. These methods also require a change of the state of a contact on the shutdown device in order to confirm that the shutdown device has attained the pre-defined position. These methods totally depend on discrete changes of state of electrical contacts for both activation and confirmation.

Digital control systems have been developed which test the operation and movement of a valve actuator, as set forth in U.S. Pat. No. 6,176,247 B1. Shut down valve operation methods and devices and described in U.S. Pat. No. 6,186,167 B1 which describes a method of moving a shut down valve, during a testing procedure, from either a fully opened or closed position to a partially closed or opened position.

The present invention includes methods for controlling the shutdown device via an analog signal, allowing for the shutdown device to move 50% without affecting the flow rate of the process. By utilizing an analog signal as a feedback of the position of the shutdown device, confirmation of a 50% change in position can be attained without the need for a change in the state of a contact. The actuation and confirmation of a change in position of the shutdown device results in a reliable "on-line" test of a shutdown device without affecting the process. Furthermore, the present invention utilizes a shut down valve with a valve coefficient of flow (CV) that allows the valve to be moved from a position beyond fully opened to a partially closed position without reducing the valve coefficient of flow below a level equal to the coefficient of flow for the process. Therefore the emergency shut down valve movement can be tested without disrupting the process flow.

The disclosure herein includes four features that make an on-line test of a shutdown device possible and unique:

1. The testing method imparts no reduced affect on the flow of raw material to the process or energy to the process. The shut down testing method utilizes a shutdown device that is larger than the valve or damper that would normally be used to control the raw material flow there through. For example; for a 1.25 inch valve the CV is 46 (valve coefficient of flow). By utilizing a 2.0 inch valve that has a CV of 120, the 2.0 inch valve can be 25% closed before its CV is equal to the CV of a fully opened 1.25 inch valve. By utilizing a ball type valve, and removing the fully-opened stop, the valve may be moved from 25% before fully opened to 25% after fully opened (25% closed) without affecting the necessary raw material flow to the process. The result is a 50% change in position of the valve without affecting the process and a test procedure that test the movement and operation of the shutdown device without affecting the flow of materials there through.

2. The method utilizes an analog signal to cause the shutdown device to move from a 25% before the fully opened position to a pre-defined 25% after fully opened position. The result is a 50% change in analog signal to the shutdown device and a 50% change in the shutdown device, without affecting the flow of raw materials to the process or affecting the flow of energy to the process.

3. The method utilizes a feedback analog signal to confirm that the shutdown device has in fact moved 50%. A failure of the shutdown device to move to the pre-defined position will sound an alarm and display the failure condition. Immediate corrections can be made to the shutdown device to return it to fully functional state. Without an on-line test, a shutdown device that failed to operate correctly can only be corrected after a costly process shutdown.

4. The system can be tested as frequently as desired, thus increasing the reliability of the shutdown device. A continuous process that shuts down once a year can only allow a test of the shutdown device once a year, whereas an on-line test of the shutdown device twice a day results in 720 test per year. There is a greater assurance that the shutdown device will function correctly when it is tested 720 times a year rather than once.

By having tested the shutdown device to 50% of stroke the following has been accomplished:

1. The analog output signal directing the valve to stroke has been tested.

2. The shutdown device hardware (valve) has been tested.

3. The analog input signal indicating shutdown device position has been tested.

Having tested the shutdown device to 50% of stroke, the device can be expected to operate to 100% of stroke on demand.

GENERAL SUMMARY DISCUSSION OF INVENTION

It is thus an object of the invention to provide a shutdown device (valve or damper) that is significantly larger than the pipe or duct that delivers raw materials to a process, and controlling that shutdown device via an analog signal, to cause the shutdown device to move 50% without affecting the process flow. To utilize an analog signal as a feedback of the position of the shutdown device, confirmation of a 50% change in position can be attained. To confirm the change in position of the shutdown valve without affecting the process.

It is another object of the present invention to enable "on-line" testing of shutdown valves and controllers, without affecting the process.

It is another object of the present invention to provide methods and apparatus which provides a method of frequent testing of the shutdown device, and improving the reliability of the shutdown system.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
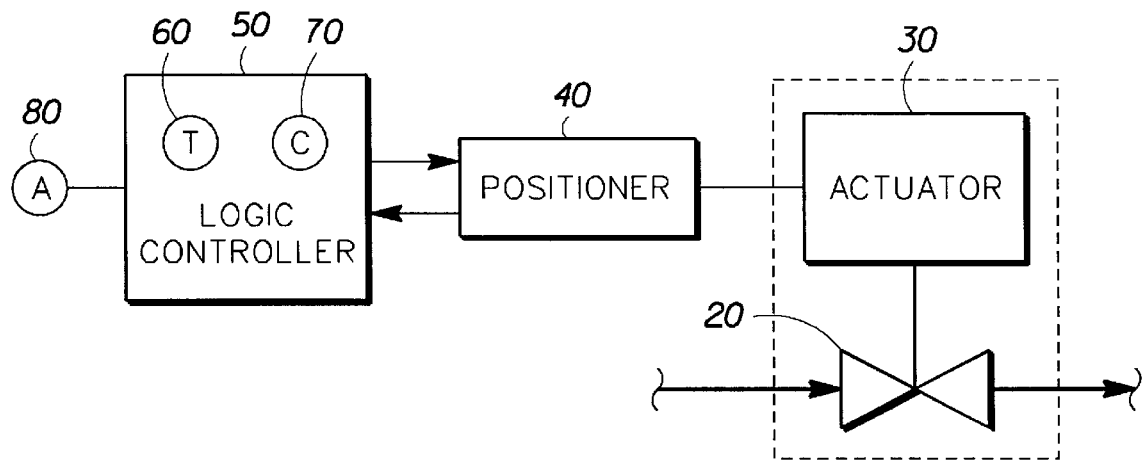
FIG. 1 is a schematic diagram illustrating a system for testing an emergency shutdown valve without affecting a normal coefficient of flow for a process system.

Apparatus for testing shutdown devices is illustrated in FIG. 1 as a schematic including an emergency shutdown valve 20, a valve actuator 30, a valve positioner 40, a programmable logic controller 50, a timer 60, a counter 70, and an audible alarm 80.

Figures 2A, 2B, 2C, 2D:
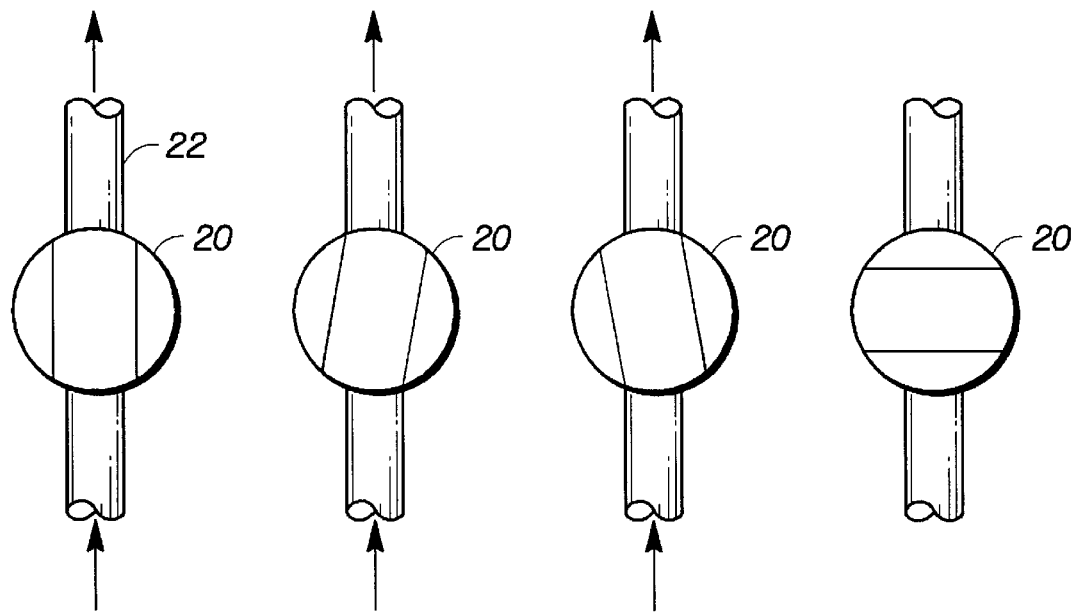
FIGS. 2, A through D are graphic illustrations of the valve in various positions including (A) a valve in a fully opened position, (B) a valve about 25% beyond fully opened, (C) a valve about 25% closed, and (D) a valve fully closed.

The emergency shutdown valve 20 is preferably a ball type valve which is capable of moving 25% beyond a fully opened position to a fully closed position. Additionally, the valve coefficient of flow when the valve is in a position 25% beyond fully opened is equal to or greater than the normal coefficient of flow for the process. The combination of a larger coefficient of flow for the valve and the additional movement of the valve beyond fully opened allows the valve to be operated a portion of its full movement without affecting the process flow and thus allowing the shutdown system to be tested as often as desired without shutting down the process. FIGS. 2, A–D illustrate the placement of a valve 20 in a process line 22 where the process line has a lower coefficient of flow than the valve. For these illustrations the valve is assumed to rotate counter-clockwise to move from the open position in FIG. 2A to the closed position in FIG. 2D. FIG. 2A illustrates the valve 20 in a fully opened position with no affect on the flow of the process. FIG. 2B illustrates the valve 20 moved about 25% beyond fully opened again without an affect on the process flow. FIG. 2C illustrates the valve in a position about 25% after fully opened, or 75% opened again without an effect on the process flow. FIG. 2D illustrates the valve in a fully closed position. An example of a valve size used to achieve about a 50% movement of the valve without affecting the process flow where the process may have required a 1.25 inch valve having a CV of 46 (valve coefficient of flow). By utilizing a 2.0 inch valve that has a CV of 120, the 2.0 inch valve can be 25% closed before its CV is equal to the CV of a fully opened 1.25 inch valve. So the 2 inch valve may be moved from 25% before fully opened to 25% after fully opened (75% closed) without affecting the necessary raw material flow to the process. The result is a 50% change in position of the valve without affecting the process and a test procedure that test the movement and operation of the shutdown device without affecting the flow of materials there through.

The valve 20 is fitted with an actuator 30 which is capable of receiving analog signals from the valve positioner 40 and moving the valve 20 to a directed position and capable of sending analog signals to the valve positioner 40 so that an actual position of the valve 20 may be recorded and compared to a directed position of the valve. The valve positioner 40 provides feedback signals to the programmable logic controller 50 and controls the actuator. The positioner 40 is calibrated so that a milliampere signal proportional to a directed valve position is comparable to an actual milliampere signal proportional to the valve position provided by the valve postioner 40.

The logic required to test the final control element should be included in a programmable logic controller 50 that has 4 to 20 milliamp analog input and 4 to 20 milliampere analog output capability. After a time delay that is greater then the time required for the valve to move to the directed position, a comparison of the analog input signal indicating the valve position to the analog output signal directing the valve to a predetermined position, shall be performed in the programmable logic controller 50. In the event that the comparison is not within the user specified tolerance, an audible alarm 80 should be actuated and a message should be displayed indicating failure of the valve to move to the position of 25% beyond fully opened or 25% closed.

The calibration of the valve positioner should be as follows:

| Analog Output from Programmable Logic Controller in milliamps (Analog Input to Positioner) | Valve Position | Valve Position Feedback Signal. Analog Input of Programmable Logic Controller (Analog Output Of Positioner) in milliamps |
| --- | --- | --- |
| 20 | 25% before fully opened | 20 |
| 16 | fully opened | 16 |
| 12 | 25% after fully opened | 12 |
| 4 | valve shut | 4 |
| 0 | valve shut | 0 |

The following is an example of the logic required to test the shutdown valve:

1. On power up, initialize the analog output to 16 ma to cause the valve 20 to be fully opened.
2. Set up one minute timer 60.
3. Assume that the shutdown valve 20 will be tested once every 8 hours. Set up counter 70 to count up to 8 hours (480 minutes).
4. When counter 70 has incremented to 480 begin test. Move valve 20 to 25% before fully opened position for 2 minutes by setting analog output to 20 milliampere.
5. One minute after valve has been directed to move to 25% before fully opened, compare the position of the valve to where it should be for a 20 ma output. If more than one minute is required to move the valve 25% this rung of logic and several others should be changed. Subtract the difference between where the valve is and where it should be.
6. If the result of the previous run is negative, perform the subtraction in the opposite direction so as to always have a positive value on which to do the compare in the following rung.
7. If the difference between the actual position that the valve moved to, compared to the true position at 25% before fully opened is greater than 8%, then the valve has failed the test. Sound an alarm through an output coil, and if the programmable controller is connected to a man machine interface print a message to the effect 'Shutdown Valve has failed to move to the correct position of 25% before fully opened'.

8. After 2 minutes has elapsed since the start of the test, move the valve to 25% after fully opened position for 2 minutes by setting analog output to 12 milliampere.
9. One minute after valve has been directed to move to 25% after fully opened, compare the position of valve to where it should be for a 12 ma output. If more than one minute is required to move the valve 50% this rung of logic and several others should be changed. Subtract the difference between where the valve is and where it should be.
10. If the result of the previous rung is negative, perform the subtraction in the opposite direction so as to always have a positive value on which to do the compare in the following rung.
11. If the difference between the actual position that the valve moved to, compared to the true position at 25% after fully opened is greater than 8%, then the valve has failed the test. Sound an alarm through an output coil, and if the programmable controller is connected to a man machine interface print a message to the effect "Shutdown Valve has failed to move to the correct position of 25% after fully opened'.
12. After test is complete, and 8 hour counter has been reset, set the valve back to fully opened.

What is claimed is:

1. An emergency shutdown system for a process system, comprising:
   a) an emergency shutdown valve with a valve actuator positioned within a desired process control system, the valve actuator is capable of moving the emergency shutdown valve beyond a fully opened position to a fully closed position, the emergency shutdown valve has a coefficient of flow such that when the valve is in a position beyond fully opened its coefficient of flow is equal to or greater than a normal coefficient of flow for the process,
   b) a valve positioner which receives input signals for commanding operation of the valve actuator, and provides output feedback signals and wherein the valve positioner further comprises a valve positioner calibrated to provide analog input signals and analog output feedback signals in relation to a position of the shutdown valve such that:
      1) a shutdown valve position associated with a 20 milliamp analog input signal when the valve position is 25% beyond fully opened, and which is 75% opened,
      2) a shutdown valve position associated with a 12 milliamp input signal when the valve position is 25% closed, and which is 75% opened,
      3) a shutdown valve position associated with a 4 milliamp input signal when the valve position is fully closed,
      4) a shutdown valve position associated with a 12 milliamp feedback signal when the valve position is 25% beyond fully opened, and which is 75% opened,
      5) a shutdown valve position associated with a 12 milliamp feedback signal when the valve position is 25% closed, and which is 75% opened, and
      6) a shutdown valve position associated with a 4 milliamp feedback signal when the valve position is fully closed,
   c) a programmable logic controller for controlling the movement and testing of the emergency shutdown valve and actuator and which produces an analog output signal to the valve positioner, and receives an analog input signal that is proportional to the valve position, and
   d) an emergency shutdown valve testing means which operates the valve actuator to move the valve from a position beyond fully opened to a partially closed position and which valve movement does not result in a valve coefficient of flow less than the normal coefficient of flow for the process.

2. A method for testing the operation of an emergency shutdown system for a process control system without interrupting the process, wherein the emergency shutdown system includes an emergency shutdown valve and a valve actuator positioned within a process system, the valve actuator is capable of moving the emergency shutdown valve beyond a fully opened position to a fully closed position and a valve coefficient of flow when the valve is in a position beyond fully opened which is equal to or greater than the normal coefficient of flow for the process, and a valve positioner which receives analog input signals for commanding operation of the valve actuator and provides analog output feedback signals, the method comprises:
   a) operating the valve actuator to move the valve from a position beyond fully opened to a partially closed position and which valve movement does not result in a valve coefficient of flow less than the normal coefficient of flow for the process,
   b) a programmable logic controller for controlling the movement and testing of the emergency shutdown valve with actuator and which receives an analog input feedback signal which is analogous to the valve position, and
   c) the valve positioner further comprises a calibration that establishes analog input signals from the programmable logic controller in relation to a position of the emergency shutdown valve, wherein the input signal is calibrated as follows:
      1) 20 milliamps when the emergency shutdown valve is in a position 25% before fully open,
      2) 16 milliamps when the emergency shutdown valve is in a position fully open,
      3) 12 milliamps when the emergency shutdown valve is in a position 25% after fully open,
      4) 4 milliamps when the emergency shutdown valve is in a position fully closed, and
      5) 0 milliamps when the emergency shutdown valve is in a position fully closed.

3. A method for testing the operation of an emergency shutdown system for a process control system without interrupting the process, wherein the emergency shutdown system includes an emergency shutdown valve and a valve actuator positioned within a process system, the valve actuator is capable of moving the emergency shutdown valve beyond a fully opened position to a fully closed position and a valve coefficient of flow when the valve is in a position beyond fully opened which is equal to or greater than the normal coefficient of flow for the process, and a valve positioner which receives analog input signals for commanding operation of the valve actuator and provides analog output feedback signals, and wherein the emergency shut down system further comprises a programmable logic controller for controlling the movement and testing of the emergency shutdown valve with actuator and which receives an analog input feedback signal which is analogous to the valve position, the method comprises: operating the valve actuator to move the valve from a position beyond fully opened to a partially closed position and which valve movement does not result in a valve coefficient of flow less than the normal coefficient of flow for the process and the method, further comprising the steps:

a) powering up the emergency shutdown system and initializing the emergency shutdown valve to a fully opened position, b) setting up a timer to a time interval required for the valve to move 25%, c) setting up a counter to establish a testing schedule, d) at the scheduled interval, moving the emergency shutdown valve to a position 25% before fully opened, e) set a timer to cause a time delay to allow the emergency shutdown valve to move to the directed position specified in step (d), f) comparing the difference between the actual position of the emergency shutdown valve and the directed position of the shutdown valve at 25% before fully opened, g) sounding an alarm if the difference in step (f) exceeds 8%, h) if the difference in step (1) does not exceed 8% then move the emergency shutdown valve to 25% after fully opened, i) set a timer to cause a time delay to allow the emergency shutdown valve to move to the directed position specified in step (h), j) comparing the difference between the actual position of the emergency shutdown valve and directed position of the shutdown valve at 25% after fully opened, k) sounding an alarm if the difference in step (j) exceeds 8%, and l) if the difference in step (j) does not exceed 8%, move the emergency shutdown valve to a fully opened position.

* * * * *